US007334765B2

(12) United States Patent
Hwang

(10) Patent No.: US 7,334,765 B2
(45) Date of Patent: Feb. 26, 2008

(54) DISPLAY APPARATUS

(75) Inventor: Jung-ho Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 420 days.

(21) Appl. No.: 10/973,238

(22) Filed: Oct. 27, 2004

(65) Prior Publication Data

US 2005/0087666 A1 Apr. 28, 2005

(30) Foreign Application Priority Data

Oct. 27, 2003 (KR) ...................... 10-2003-0075084

(51) Int. Cl.
*E04G 3/00* (2006.01)
(52) U.S. Cl. .................... 248/284.1; 248/923; 361/681
(58) Field of Classification Search ............. 248/276.1, 248/278.1, 917–923, 284.1, 25.1, 157, 371, 248/922; 361/681; 211/96, 100, 104
See application file for complete search history.

(56) References Cited

U.S. PATENT DOCUMENTS

| 5,975,472 | A * | 11/1999 | Hung ...................... 248/278.1 |
| 6,019,332 | A | 2/2000 | Sweere et al. |
| 6,478,275 | B1 * | 11/2002 | Huang ...................... 248/284.1 |
| 6,554,238 | B1 * | 4/2003 | Hibberd ................... 248/278.1 |
| 6,874,743 | B2 * | 4/2005 | Watanabe et al. ........ 248/276.1 |
| 6,886,701 | B2 * | 5/2005 | Hong et al. ................... 211/99 |
| 6,905,101 | B1 * | 6/2005 | Dittmer ................... 248/274.1 |
| 7,028,961 | B1 * | 4/2006 | Dittmer et al. .......... 248/278.1 |
| 7,097,143 | B2 * | 8/2006 | Kim et al. ................... 248/201 |
| 7,178,775 | B2 * | 2/2007 | Pfister et al. ........... 248/292.14 |
| 2002/0011544 | A1 * | 1/2002 | Bosson ....................... 248/121 |
| 2003/0075649 | A1 * | 4/2003 | Jeong et al. ................ 248/157 |

FOREIGN PATENT DOCUMENTS

| JP | 11-272187 | 8/1999 |
| JP | 2000-333101 | 11/2000 |
| JP | 2001-128088 | 5/2001 |
| JP | 2002-366047 | 12/2002 |
| KR | 1020030012977 | 2/2003 |
| KR | 1020030025988 | 3/2003 |
| KR | 200314494 | 5/2003 |
| KR | 1020030056775 | 7/2003 |

* cited by examiner

*Primary Examiner*—Carl D. Friedman
*Assistant Examiner*—Tan Le
(74) *Attorney, Agent, or Firm*—Staas & Halsey LLP

(57) ABSTRACT

The present invention relates to a display apparatus having: a display to display a picture; a mounting unit to mount the display on a mounting surface. The mounting unit has: a supporting bracket to support the display; a tilting hinge provided between the mounting surface and the supporting bracket to rotatably support the supporting bracket centering on a first axis along a first direction of the display; and a pivoting hinge provided between the supporting bracket and the display to rotatably support the display centering on a second axis formed along a second direction of the display, substantially perpendicular to the first direction. The pivoting hinge has: a pivoting shaft provided in a central part of the supporting bracket; a supporting disc stationarily connected to the pivoting shaft and connected to the supporting bracket; and a rotating disc rotatably connected to the pivoting shaft and connected to the display.

35 Claims, 10 Drawing Sheets

DISPLAY APPARATUS

CROSS-REFERENCE TO RELATED APPLICATIONS

This application claims the benefit of Korean Patent Application No. 2003-75084, filed on Oct. 27, 2003, in the Korean Intellectual Property Office, the disclosure of which is incorporated herein by reference.

BACKGROUND OF THE INVENTION

1. Field of the Invention

The present invention relates to a display apparatus, and more particularly, to a display apparatus having an improved structure of a mounting unit, with which a display mounted on a wall is not only tilted but also pivoted.

2. Description of the Related Art

Generally, a display apparatus comprises a display displaying a picture by receiving an electrical signal, and a mounting unit to mount the display on a predetermined mounting surface.

Recently, display apparatuses have used a liquid crystal display (LCD) or a plasma display panel (PDP), both of which provide a display having a relatively thin thickness compared with the area thereof. Thus, the display apparatus can be mounted on a wall with ease. Further, a display that can be rotated in a frontward and backward direction and in a leftward and rightward direction has been required.

A conventional mounting unit of the wall-mounting-type display apparatus that can be rotated frontward and backward (tilted), and leftward and rightward (pivoted), requires a plurality of links or ball bearings, which makes the structure of the mounting unit complicated and increases manufacturing cost. Moreover, if the display apparatus has a large size, the display apparatus will counter a potentially large force due to gravity. To solve the above problem, the conventional display apparatus has used a mounting unit having a complicated structure.

SUMMARY OF THE INVENTION

Accordingly, it is an aspect of the present invention to provide a display apparatus having a mounting unit that has a simple structure and can pivotably and tiltably support a display of large size on a wall with stability.

Additional aspects and/or advantages of the invention will be set forth in part in the description which follows and, in part, will be obvious from the description, or may be learned by practice of the invention.

The foregoing and/or other aspects of the present invention are achieved by providing a display apparatus having: a display to display a picture; a mounting unit to mount the display on a mounting surface, the mounting unit having: a supporting bracket to support the display; a tilting hinge provided between the mounting surface and the supporting bracket to tiltably support the supporting bracketto tilt in frontward and backward directions relative to the mounting surface; and a pivoting hinge provided between the supporting bracket and the display to pivotably support the display to pivot in clockwise and counterclockwise directions relative to the supporting bracket, the pivoting hinge having a pivoting shaft provided in a central part of the supporting bracket a supporting disc stationarily connected to the pivoting shaft and connected to the supporting bracket and a rotating disc rotatably connected to the pivoting shaft and connected to a first surface of the display.

According to an aspect of the invention, the supporting disc of the pivoting hinge has a supporting protrusion on a surface facing the rotating disc and the rotating disc of the pivoting hinge is formed with a rotating protrusion on a surface facing the supporting disc, and the supporting protrusion and the rotation protrusion are approximately equidistant from the center of the pivoting shaft and limit a rotation angle of the pivoting hinge by contacting with each other.

According to an aspect of the invention, the display apparatus additionally has: a main body bracket provided between the display and the supporting bracket and connected to the first surface of the displayer, wherein the rotating disc of the pivoting hinge is connected to the main body bracket.

According to an aspect of the invention, the pivoting shaft of the pivoting hinge has a bolt passing through a central part of the supporting bracket stationarily connected to the supporting disc, rotatably connected to the rotating disc, passing through the main body bracket, and connected with a nut.

According to an aspect of the invention, the display apparatus additionally has a washer provided between a head of the bolt and the supporting bracket.

According to an aspect of the invention, the tilting hinge has: a main hinge provided on a first part of the supporting bracket to rotate the supporting bracket relative to the mounting surface; and a link assembly has: a first link having a first end rotatably connected to the mounting surface to connect the supporting bracket to the mounting surface on a second part of the supporting bracket; a second link having a first end rotatably connected to the supporting bracket and a second end rotatably connected to a second end of the first link, and a spring provided on at least one point at which each of the first link and the second link is rotated, having an elasticity to restore the supporting bracket to the mounting surface.

According to an aspect of the invention, the display apparatus additionally has: an attaching bracket provided between the supporting bracket and the mounting surface and attached on the mounting surface, wherein the first link and the main hinge of the tilting hinge are connected to the attaching bracket.

According to an aspect of the invention, the link assembly additionally has a friction part provided between the first link and the second link and produces a rotational friction therebetween.

According to an aspect of the invention, the rotational friction is larger than the elasticity of the spring.

According to an aspect of the invention, the spring is a torsion spring, and the torsion spring has a first end supported by the first link and a second end supported by the second link.

According to an aspect of the invention, the friction part has: a connecting bolt inserted in the torsion spring and passing through the first link and the second link; a connecting nut connected with the connecting bolt; and at least one washer provided between a head of the connecting bolt and the connecting nut.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
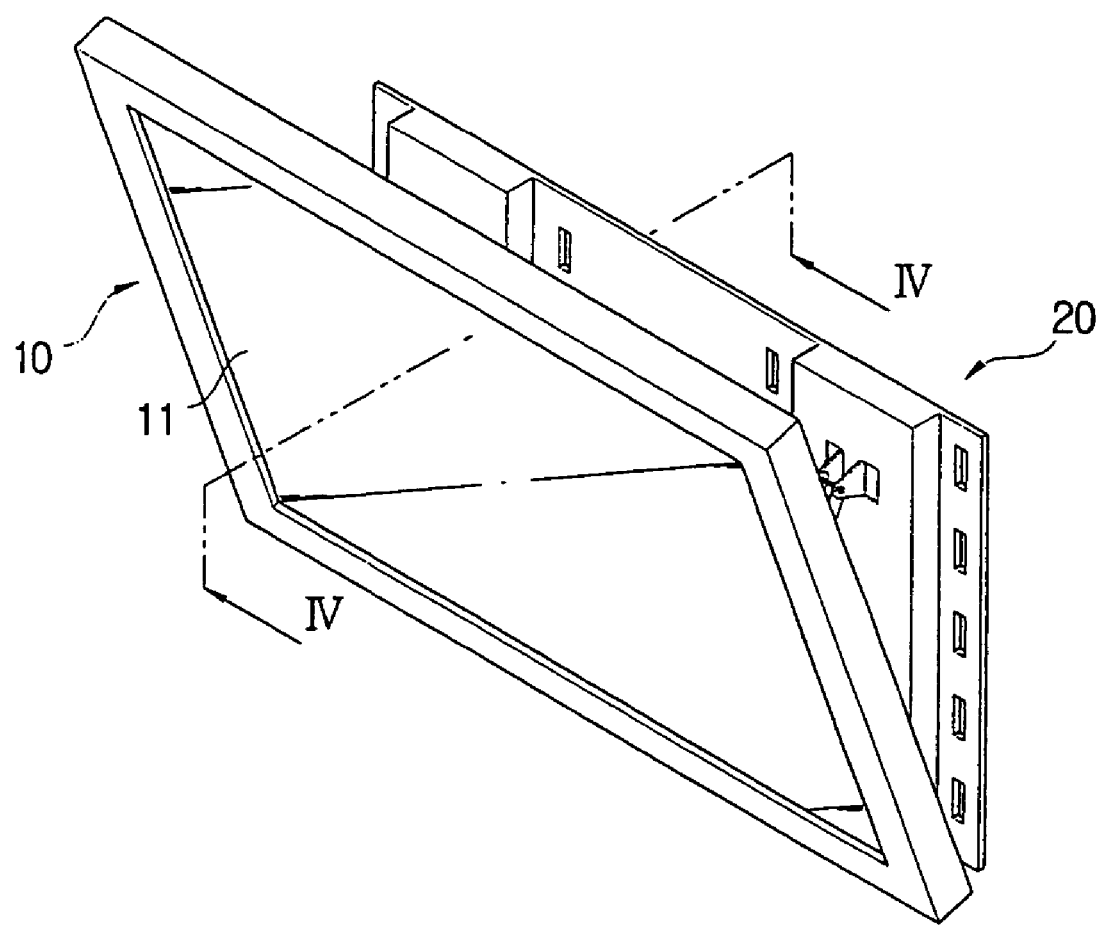
FIG. 1 is a perspective view of a display apparatus according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Relating to a rotation direction of a display, tilting occurs when the display rotates in forward and backward directions relative to a mounting surface, and pivoting occurs when the display rotates in clockwise and counterclockwise directions relative to the mounting surface.

Figure 2:
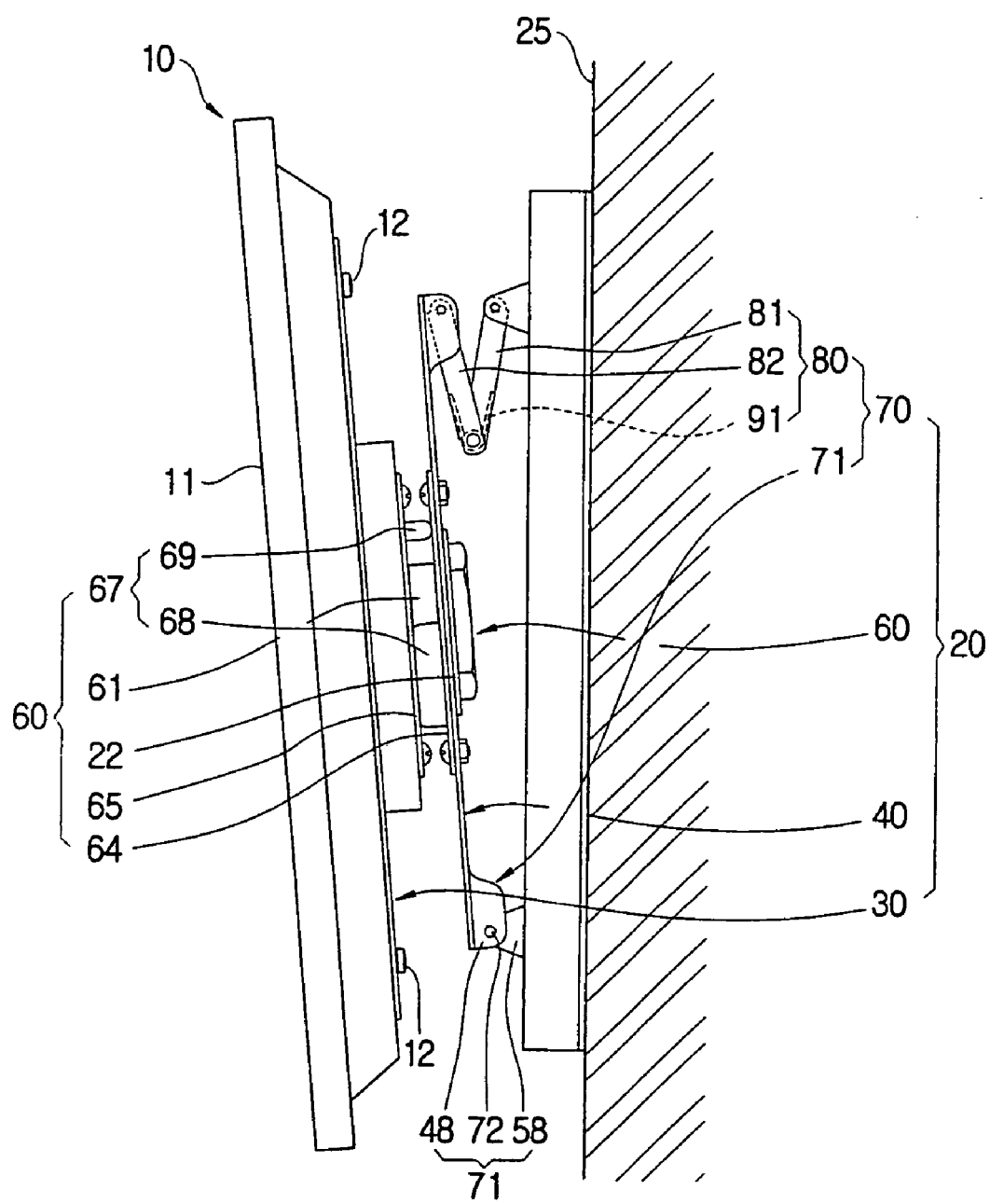
FIG. 2 is a lateral view showing the display apparatus of FIG. 1 mounted on a wall.

As is shown in FIGS. 1 and 2, a display apparatus according to an embodiment of the present invention comprises a display 10 to display a picture thereon, a mounting unit 20 to tiltably and pivotably mount the display 10 on a wall 25.

The display 10 is provided with a thin display panel 11 such as a liquid crystal display (LCD), a plasma display panel (PDP) and the like, to display a picture, and a mounting protrusion 12 provided on a rear surface of the display 10, to be inserted in the mounting unit 20.

Figure 3:
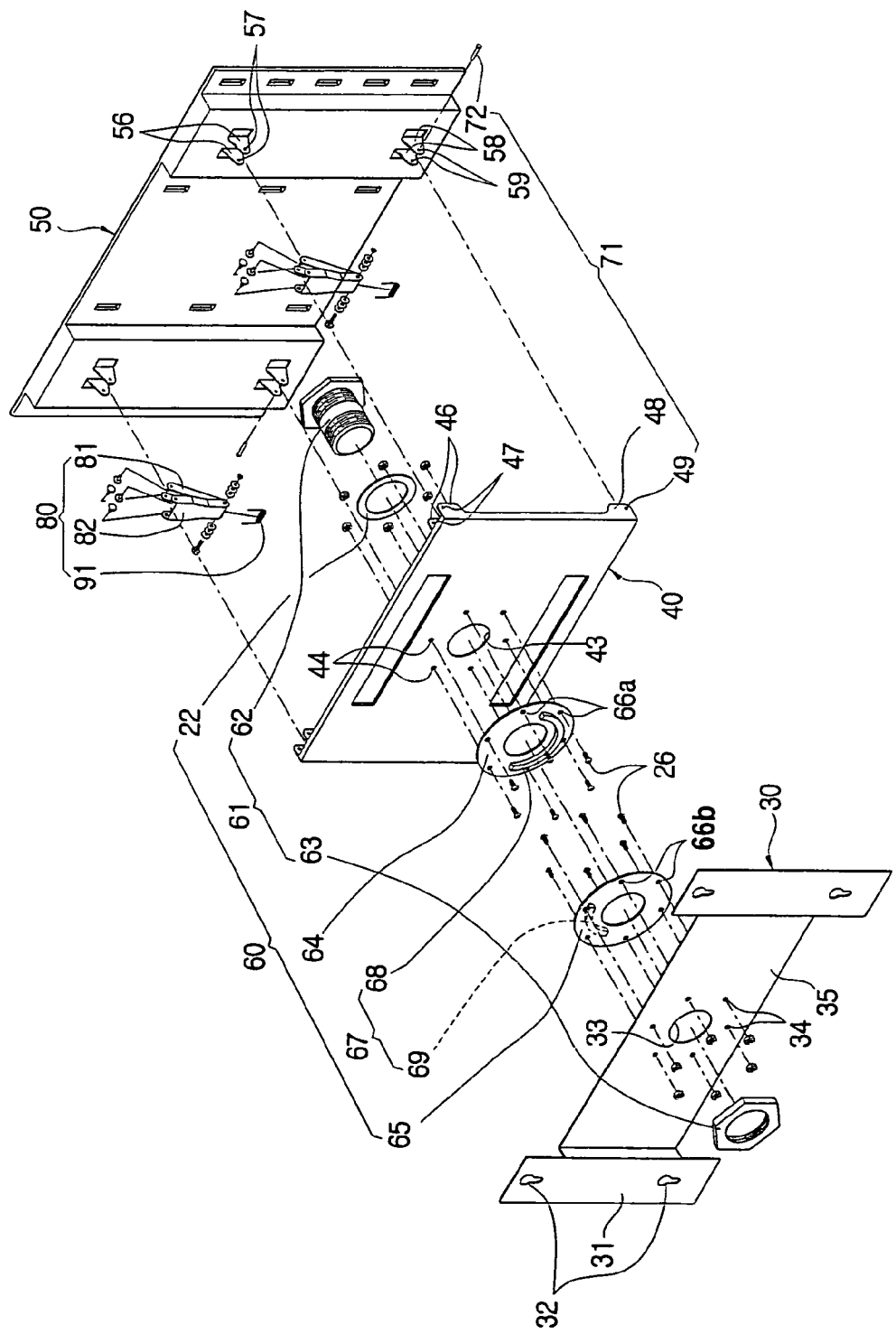
FIG. 3 is an exploded view of the display apparatus of FIG. 1.
Figure 4:
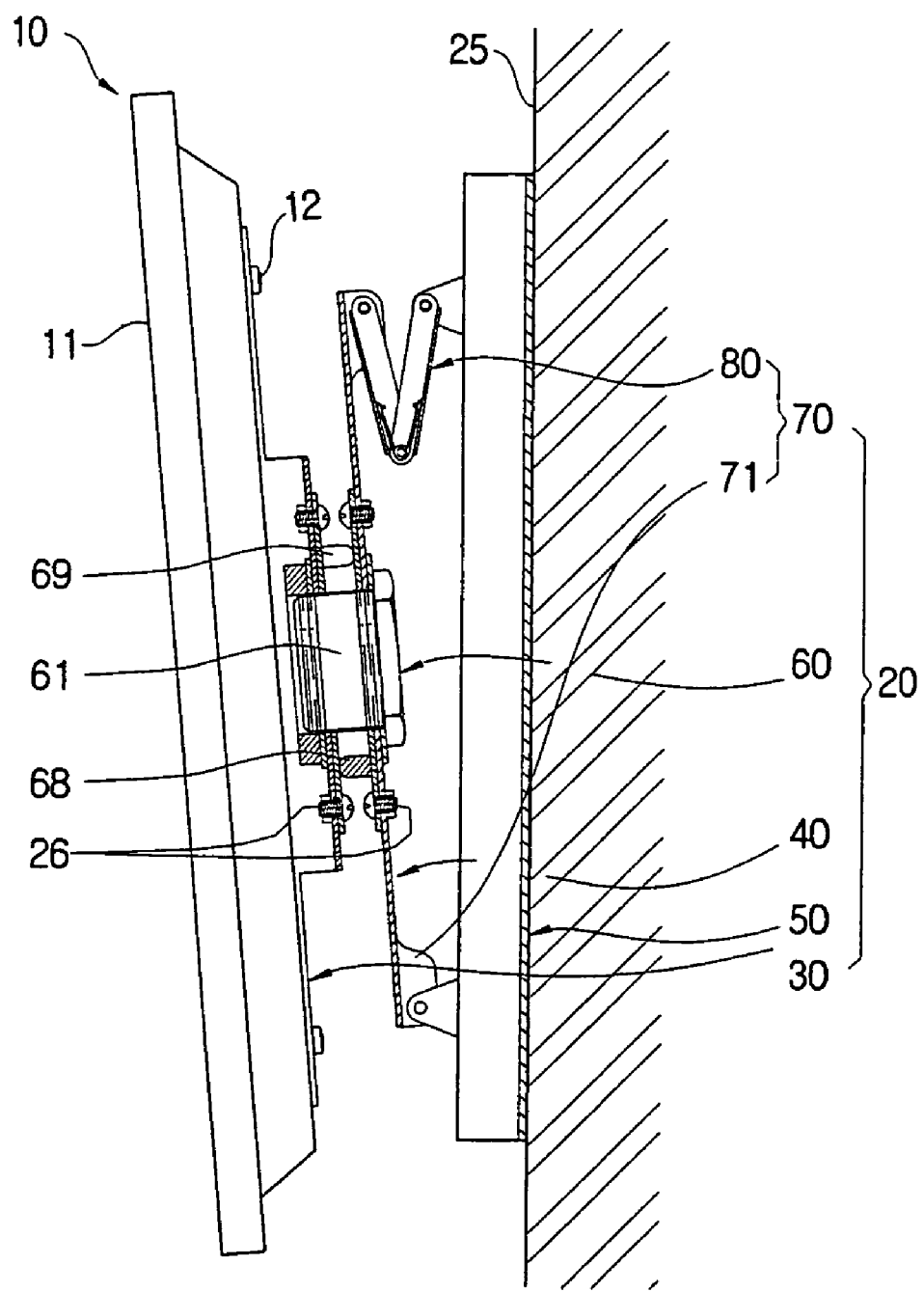
FIG. 4 is a sectional view of the display apparatus taken along line IV-IV in FIG. 1.

As is shown in FIGS. 3 and 4, the mounting unit 20 comprises: a supporting bracket 40 to support the display 10; a main body bracket 30 provided between the display 10 and the supporting bracket 40 to be connected to a rear surface of the display 10; an attaching bracket 50 provided between the supporting bracket 40 and the wall 25 to be attached to the wall 25; a tilting hinge 70, which is provided between the supporting bracket 40 and the attaching bracket 50, and by which the supporting bracket 40 tilts relative to the attaching bracket 50, and therefore moves frontward and backward relative to the attaching bracket 50 and the wall 25; and a pivoting hinge 60, which is provided between the main body bracket 30 and the supporting bracket 40, and by which the main body bracket 30 pivots relative to the supporting bracket 40, and therefore moves in clockwise and counterclockwise directions relative to the supporting bracket 40 and the wall 25.

Figure 5:
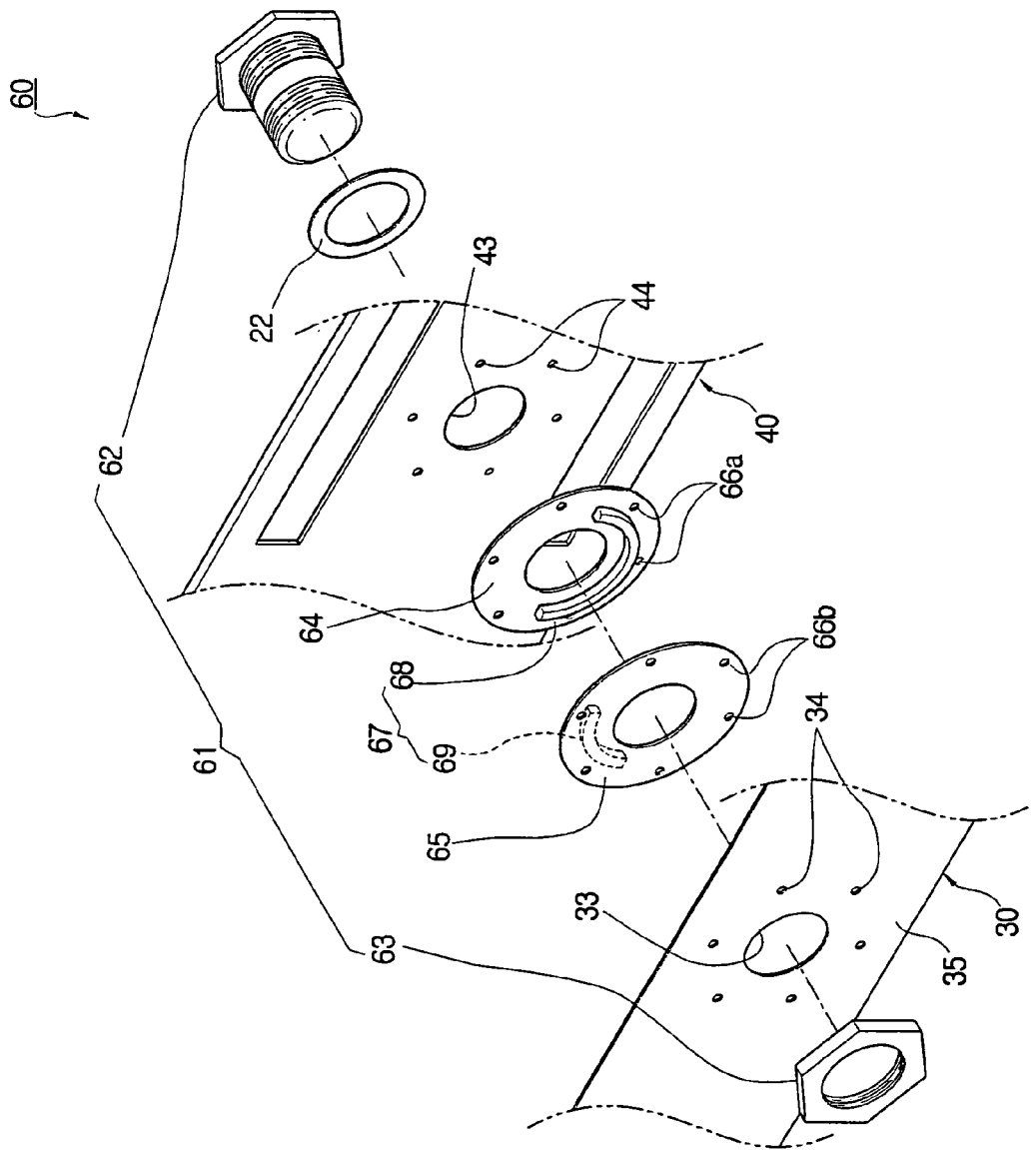
FIG. 5 is an exploded perspective view of a pivoting hinge of the display apparatus of FIG. 1.

As is shown in FIG. 5, the pivoting hinge 60 comprises: a pivoting shaft 61 inserted into a central part of the supporting bracket 40, a supporting disc 64 that is stationarily connected to the pivoting shaft 61 and connected to the supporting bracket 40, a rotating disc 65 that is rotatably connected to the pivoting shaft 61 and connected to the main body bracket 30, and a pivoting angle limiter 67 limiting a pivoting angle of the main body bracket 30 relative to the supporting bracket 40.

The pivoting shaft 61 comprises a bolt 62 that passes through the central part of the supporting bracket 40, is stationarily connected to the supporting disc 64 and rotatably connected to the rotating disc 65, passes through the main body bracket 30, and is inserted in a nut 63. As is shown in FIG. 4, according to one aspect a part of a circumferential surface of the bolt 62 that is in contact with the main body bracket 30 and the rotating disc 65 is not threaded. Then, the pivoting shaft 61 can be rotated relative to the main body bracket 30 due to the friction force between the pivoting shaft 61 and the rotating disc 65, while the pivoting shaft 61 is stationarily connected to the supporting bracket 40 and the supporting disc 64 due to a threaded part of the pivoting shaft.

According to one aspect, a washer 22 is provided between a head of the bolt 62 forming the pivoting shaft 61 and the supporting bracket 40. Then, the washer 22 provides a sufficiently great friction force between the head of the bolt 62 and the supporting bracket 40, thereby preventing the pivoting shaft 61 from sliding toward the main body bracket 30 or the supporting bracket 40. Thus, the pivoting shaft 61 is not unnecessarily rotated when the display 10 is pivoted.

The supporting disc 64 and the rotating disc 65 are provided with a plurality of screw holes 66a and 66b, respectively. The supporting disc 64 is connected to the supporting bracket 40 with screws 26 and the rotating disc 65 is connected to the main body bracket 30 with the screws 26.

The pivoting angle limiter 67 comprises a supporting protrusion 68 positioned on the supporting disc 64 and a rotating protrusion 69 positioned on the rotating disc 65. The surface of the supporting disc 64 having the supporting protrusion 68 faces the rotating disc 65, while the surface of the rotating disc 65 having the rotating protrusion 69 faces the supporting disc 64. Each of the supporting protrusion 68 and the rotating protrusion 69 is approximately equidistant from a center of the pivoting shaft 61. Thus, the supporting protrusion 68 meets with the rotating protrusion 69, which limits the pivoting angle of the pivoting hinge 60. According to each of the thickness and length of the supporting protrusion 68 and the rotating protrusion 69, the pivoting angle of the pivoting hinge 60 is determined. The rotating disc 65 and the supporting disc 64 are spaced with a distance corresponding to the thickness of one of the supporting protrusion 68 and the rotating protrusion 69, whichever is thicker.

According to one aspect, the supporting protrusion 68 is integrally formed with the supporting bracket 40. According to another aspect, the rotating protrusion 69 is integrally formed with either the display 10 or the main body bracket 30.

Figure 9:
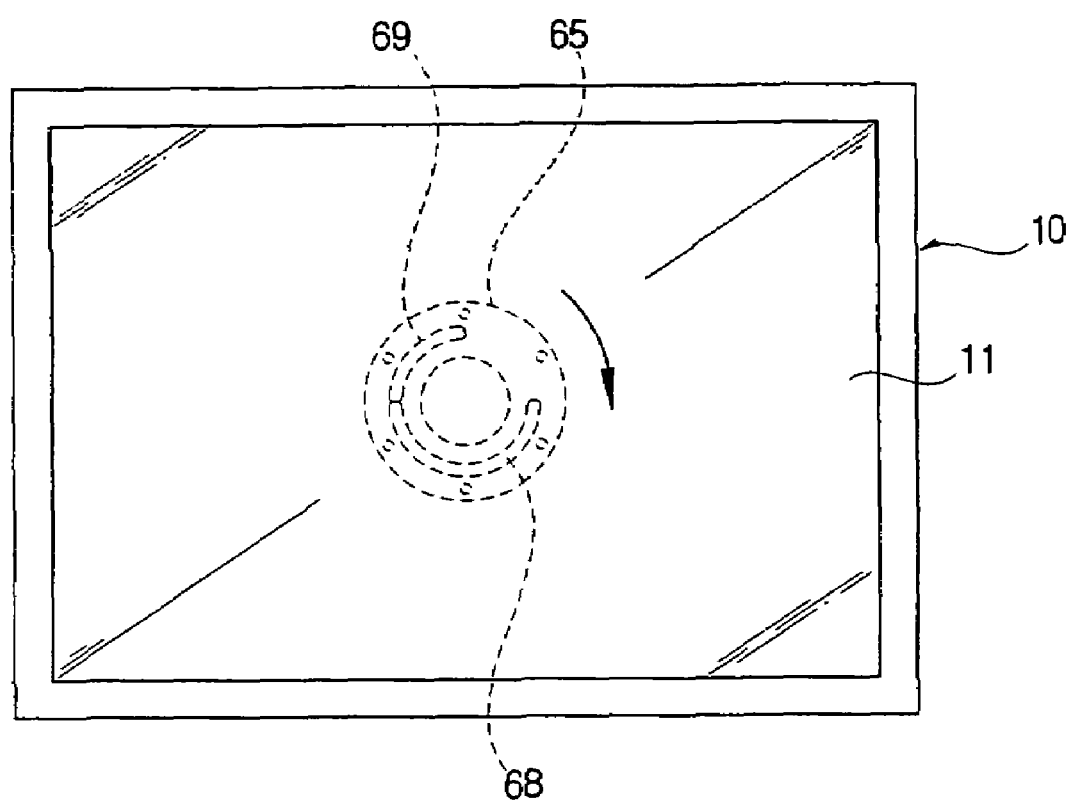
FIGS. 9 and 10 show how the display apparatus of FIG. 1 pivots.
Figure 10:
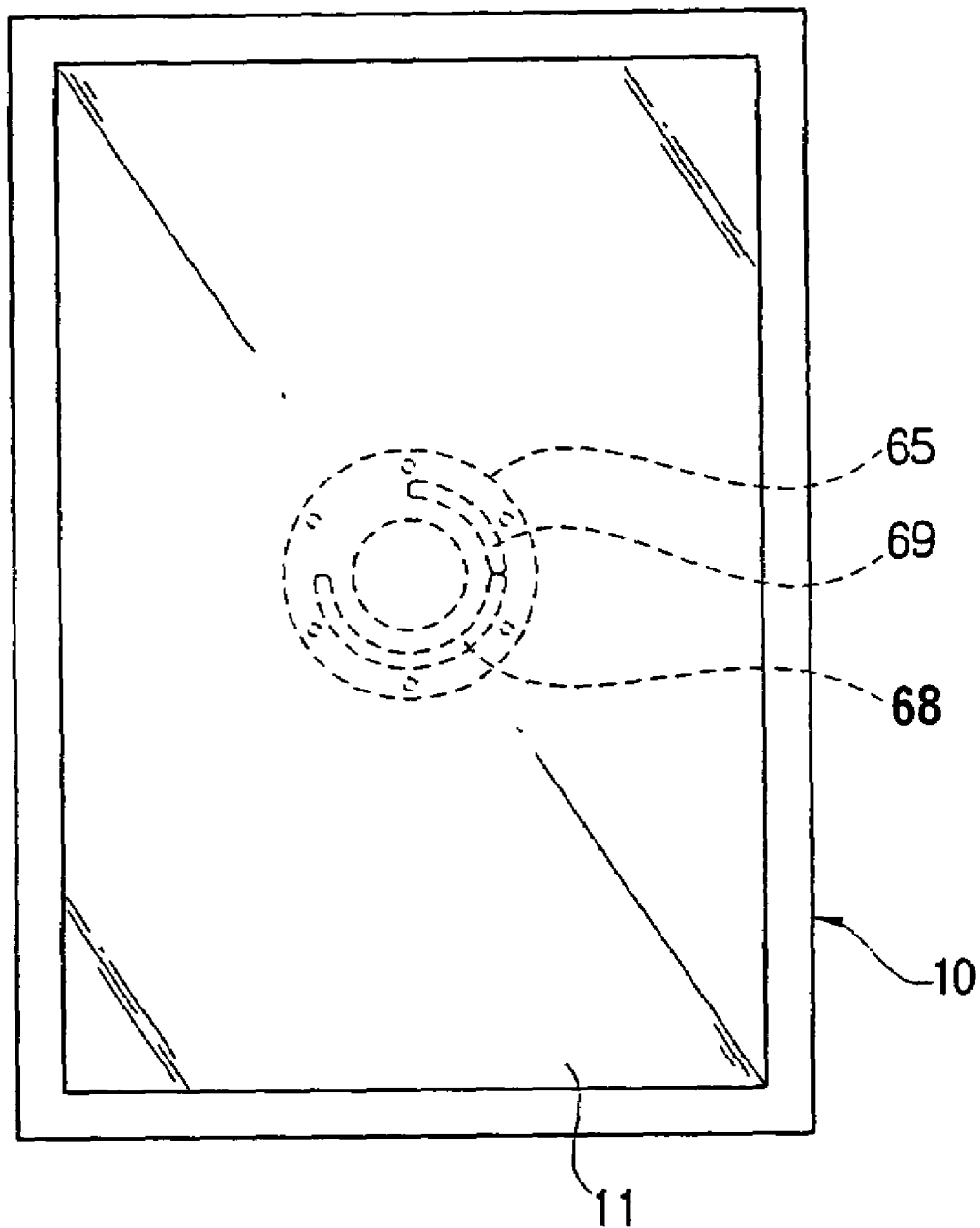

As is shown in FIGS. 5, 9 and 10, according to one aspect, the supporting protrusion 68 is an arc of about 180° relative to the center of the supporting disc 64, while the rotating protrusion 69 is an arc of about 90° relative to the center of the rotating disc 65. Thus, the display 10 pivots within a pivoting angle of approximately 90°. Moreover, the display 10 may pivot with more stability due to the pivoting angle limiter having the structure described above.

As an aspect of the present invention, for a smooth rotation, lubricating material such as oil is provided between the pivoting shaft 61 and the rotating disc 65, between the supporting protrusion 68 and the rotating disc 65, and between the rotating protrusion 69 and the supporting disc 64.

As is shown in FIG. 3, the main body bracket 30 comprises: connecting parts 31 that connect to a rear surface of the display 10; a bracket main body 35 having a shaft accommodating hole 33 in which the pivoting shaft 61 is inserted; and main body holes 34 positioned corresponding to the screw holes 66b positioned on the rotating disc 65, through which the screws 26 are inserted in the rotating disc 65.

Each of the connecting parts 31 of the main body bracket 30 comprises mounting protrusion holes 32 to accommodate the mounting protrusion 12 positioned on the rear of the display 10. Each of the protrusions 12 positioned on the rear of the display 10 is inserted in the mounting protrusion hole 32, so that the display 10 is detachably connected with the main body bracket 30.

In the embodiment described above, the main body bracket 30 is added between the display 10 and the supporting bracket 40. But according to one aspect, the pivoting hinge 60 is directly connected to the rear surface of the display 10, so that the main body bracket 30 is not required.

As is shown in FIG. 3, the supporting bracket 40 comprises: a pivoting shaft hole 43 to accommodate the pivoting shaft 61; supporting holes 44, through which the supporting bracket 40 is connected with the supporting disk 64 with the screws 26, and which are positioned corresponding to the screw holes 66a of the supporting disc 64; second flanges 46 having second pin connecting holes 47 rotatably connected with second pin accommodating holes 84 of a second link 82 (to be described later) connected with the tilting hinge 70; and supporting flanges 48 having lower pin connecting holes 49 rotatably connected with lower pin accommodating holes 59 of the attaching bracket 50.

As is shown in FIG. 3, the attaching bracket 50 comprises: first flanges 56 provided on an upper part of the attaching bracket 50 and having first pin connecting holes 57 rotatably connected with first pin accommodating holes 83 of a first link 81 of the tilting hinge 70 (to be described later), and attaching flanges 58 (to be described later) provided on a lower part of the attaching bracket 50 and having the lower pin accommodating holes 59. The attaching bracket 50 is attached on the wall 25 to support the display 10. According to another aspect, the first link 81 and a lower hinge 71 of the tilting hinge 70 are directly mounted on the wall 25, so that the attaching bracket 50 is not required.

Figure 8:
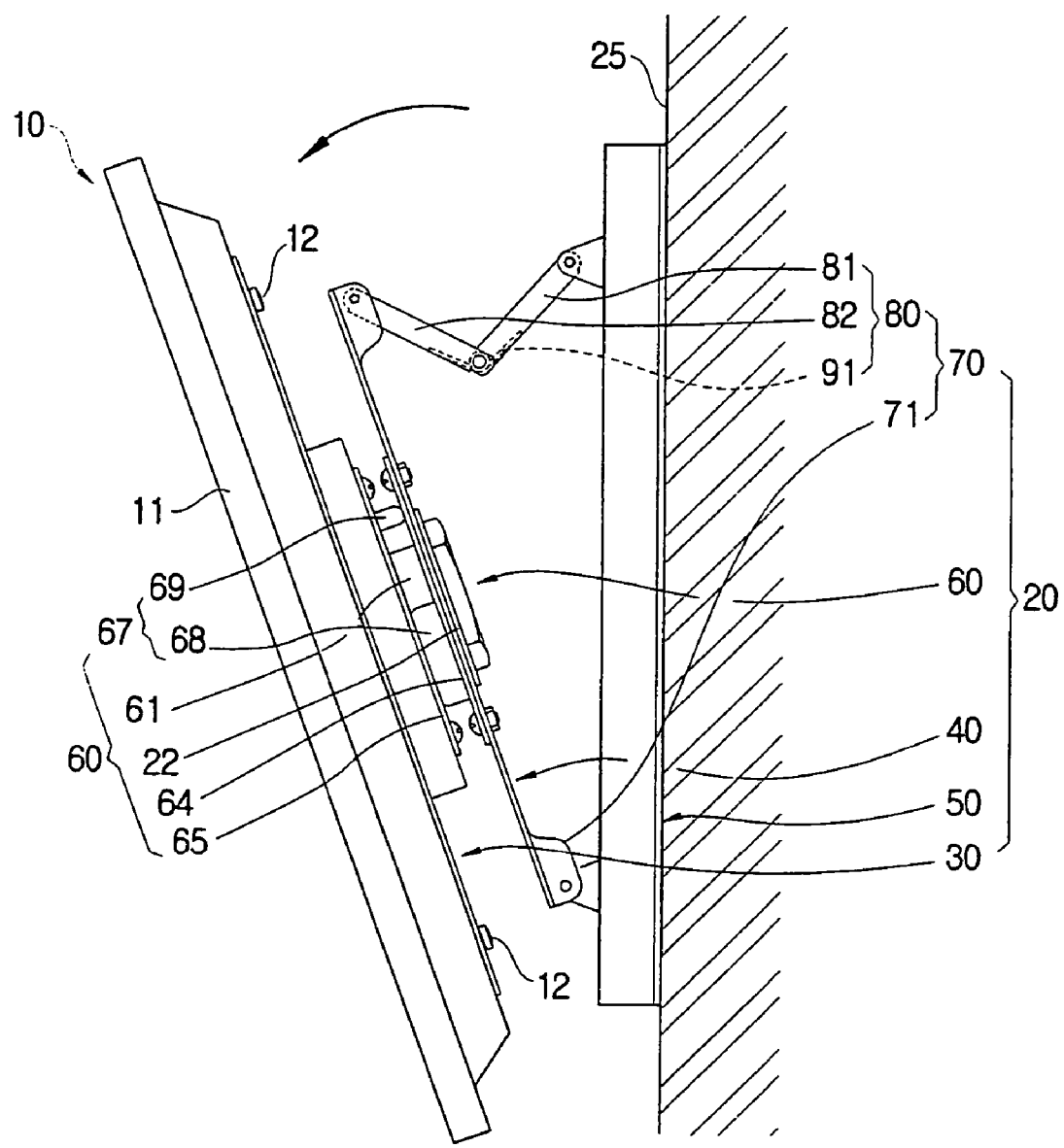

As is shown in FIGS. 3 and 8, the tilting hinge 70 comprises the lower hinge 71 provided on a lower part of the supporting bracket 40 to tilt the supporting bracket 40 relative to the attaching bracket 50 and a link assembly 80 provided on an upper part of the supporting bracket 40 and linking the supporting bracket 40 and the attaching bracket 50, to adjust a space between the supporting bracket 40 and the attaching bracket 50.

The lower hinge 71 comprises: the supporting flanges 48 having the lower pin connecting holes 49 of the supporting bracket 40, the attaching flanges 58 having the lower pin accommodating holes 59 of the attaching bracket 50, and lower hinge pins (or attaching hinge pins) 72 rotatably connecting the lower pin connecting holes 49 and the lower pin accommodating holes 59.

Figure 6:
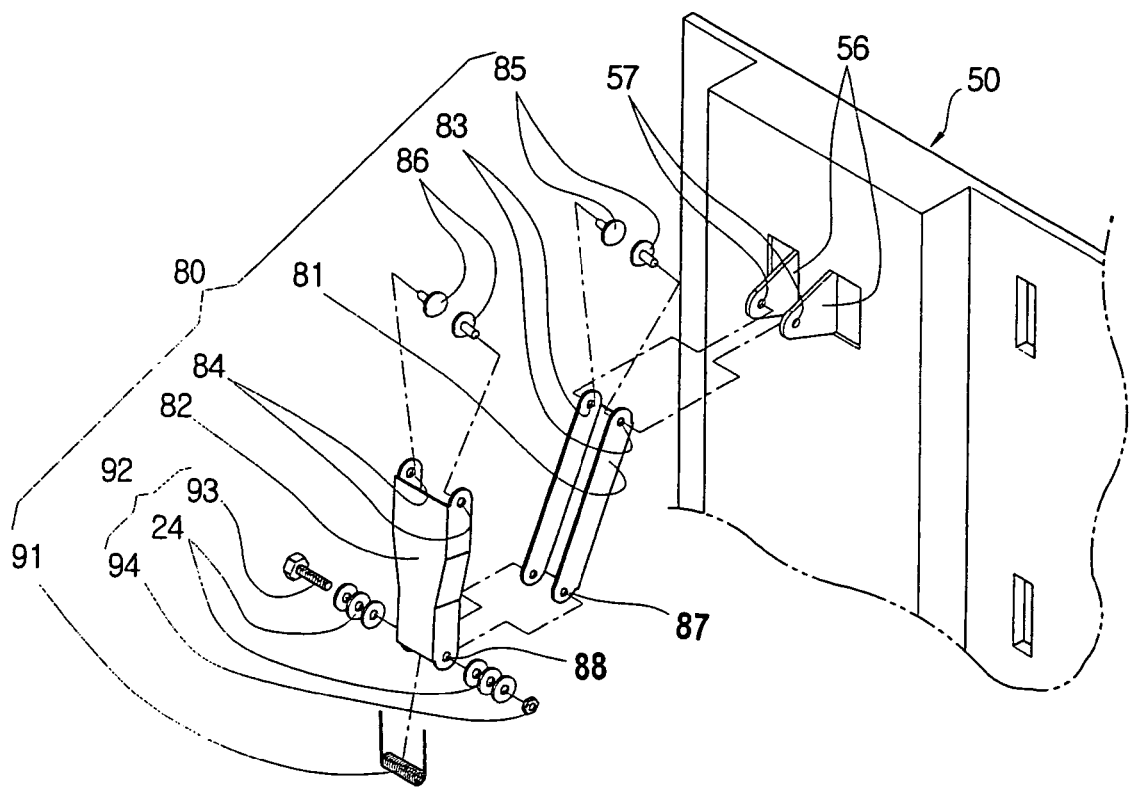
FIG. 6 is an exploded perspective view of a link assembly of the display apparatus of FIG. 1.

As is shown in FIGS. 6 and 8, the link assembly 80 comprises: the first link 81 provided on an upper part of the attaching bracket 50, the second link 82 provided on an upper part of the rear of the supporting bracket 40 and connected with the first link 81 to adjust the space between the supporting bracket 40 and the attaching bracket 50, an elastic member (torsion spring) 91 provided between the first link 81 and the second link 82 and having an elasticity to restore the supporting bracket 40 to the attaching bracket 50, and a friction part 92 provided between the first link 81 and the second link 82 and producing a rotation friction therebetween. Here, the rotation friction of the friction part 92 is preferably larger than the elasticity of the torsion spring 91.

According to one aspect, the first link 81 has a "U" shaped cross section and comprises a first end having the first pin accommodating holes 83 rotatably connected with the first pin inserting holes 57 of the attaching bracket 50 with a first hinge pin 85, and a second end having bolt connecting holes 87 rotatably connected with the second link 82.

The second link 82 comprises a first end having the second pin accommodating holes 84 rotatably connected with the second pin connecting holes 47 of the supporting bracket 40 with the second hinge pin 86, and a second end having bolt accommodating holes 88 rotatably connected with the bolt connecting holes 87 of the first link 81. The second link 82 has a "U" shaped cross section and is larger than the first link 81 in width, so that the first link 81 can be folded and accommodated in the second link 82.

The torsion spring 91 is installed on a connecting bolt 93 of the friction part 92 (to be described later). The torsion spring has a first end coupled to the first link 81 and a second end coupled to the second link 82. The torsion spring elastically draws the second link 82 to the first link 81. Thus, the torsion spring 91 elastically restores the display 10 to the wall 25. According to one aspect, the elasticity of the torsion spring 91 is approximately equal to the torque produced by the weight of the display 10 about the lower hinge 71.

The friction part 92 comprises: the connecting bolt 93 passing through the bolt connecting holes 87 of the first link 81 and the bolt accommodating holes 88 of the second link 82 to be inserted in the torsion spring 91, a connecting nut 94 connected with the connecting bolt 93, and a plurality of washers 24 provided between a head of the connecting bolt 93 and the connecting nut 94. As the connecting bolt 93 is tightened with the connecting nut 94, the friction part 92 produces the rotation friction between the first link 81 and the second link 82. According to one aspect, the rotation friction is larger than the elasticity of the torsion spring 91. Then, although the display 10 is separated from the main body bracket 30, a rotation angle of the supporting bracket 40 relative to the attaching bracket can remain almost unchanged, because the rotation friction of the friction part 92 is larger than the elasticity of the torsion spring 91. The plurality of washers 24 between the head of the connecting bolt 93 and the connecting nut 94 prevent the connecting bolt 93 from being loosened from the connecting nut 94.

In the embodiment described above, the friction part 92 is provided between the first and second links 81 and 82 to produce the rotation friction. But according to another aspect, the friction part 92 is provided between the attaching bracket 50 and the first link 81. According to yet another aspect, the friction part 92 is provided between the supporting bracket 40 and the second link 82. According to still yet another aspect, the friction part 92 is provided on more than one of the connections between the supporting bracket 40, the second link 82, the first link 81, and the attaching bracket 50.

Further, in the embodiment described above, the torsion spring 91 is provided in the friction part 92 between the first and second links 81 and 82. But, according to another aspect, the torsion spring 91 is provided at any place within which the first and second links 81 and 82 are rotated between the supporting bracket 40 and the attaching bracket 50. According to one aspect, the torsion spring 91 is a flat spring. According to another aspect, the torsion spring 91 is a coil spring. According to yet another aspect, the torsion spring may, either additionally or instead, be positioned on the lower hinge pin 72.

According to one aspect, as is shown in FIG. 3, two lower hinges 71 are provided. Similarly, according to one aspect, two link assemblies 80 are provided. It will be readily recognized, however, that there may be only one lower hinge 71 and one link assembly 80, or there may be more than two lower hinges 71 and more than two link assemblies 80.

Figure 7:
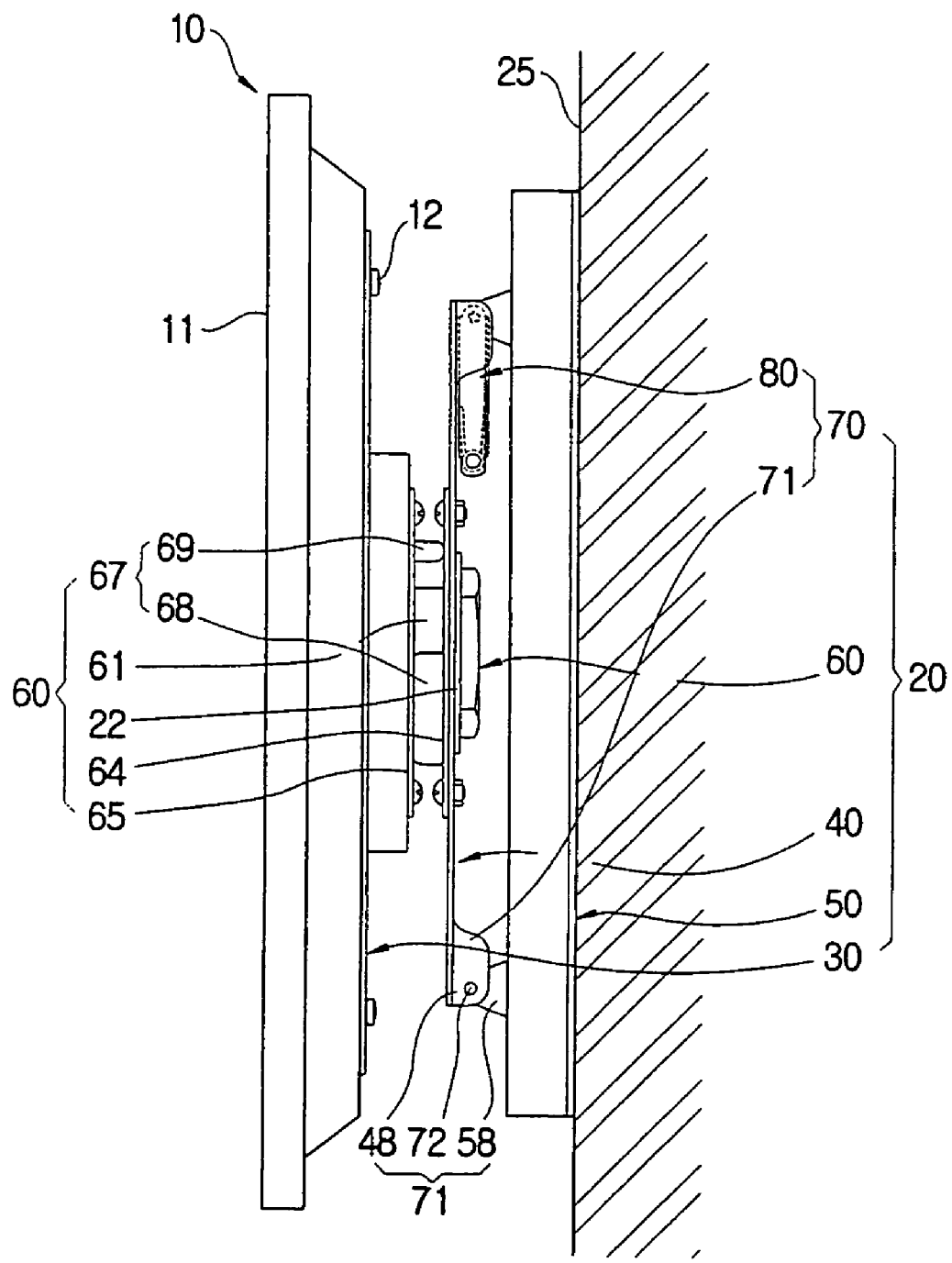
FIGS. 7 and 8 show how the display apparatus of FIG. 1 is tilted.

As is shown in FIG. 7, the display 10 is rotated relative to the lower hinge 71 and folded on the wall 25, if a user pushes the display 10 shown in FIG. 2 toward the wall 25 with a predetermined amount of force. Here, due to the elasticity of the torsion spring 91 elastically restoring the display 10 toward the wall 25, the user can rotate the display 10 toward the wall 25 by applying only a small force. The second link 82 is rotated relative to the friction part 92, so that the first link 81 is folded on the second link 82 and the second link 82 is folded on the supporting bracket 40. Thus, the supporting bracket 40 is in contact with the attaching bracket 50. Further, the displaying apparatus can remain folded due to the rotation friction of the friction part 92.

As shown in FIG. 8, the display 10 is rotated relative to the lower hinge 71 if the user pulls the display 10 shown in FIG. 7 toward the user with a predetermined amount of force. Here, the elasticity of the torsion spring 91 elastically restoring the display 10 toward the wall 25 is applied, which prevents the display from suddenly rotating toward the user. Further, the displaying apparatus can remain unfolded due to the rotation friction of the friction part 92. A stopper (not shown) is provided between the first link 81 and the second link 82 and/or at the lower hinge 71, to prevent the display 10 from rotating farther than a predetermined rotation angle.

With the above configuration, the display apparatus mounted on the wall can not only be tilted, but also pivoted, so that the viewing angle of the display can be adjusted as desired.

Further, according to the pivoting hinge and the tilting hinge of the display apparatus of an embodiment of the present invention, the structure of the mounting unit tiltably and pivotably supporting the display on the wall can be simplified, and a large display apparatus can be supported with stability.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A display apparatus comprising:
a display to display an image;
a mounting unit to mount the display on a mounting surface, the mounting unit comprising:
a supporting bracket to support the display,
an attachment bracket attached to the mounting surface,
a tilting hinge provided between the attachment bracket and the supporting bracket to tiltably support the supporting bracket to tilt in frontward and backward directions relative to the mounting surface, and
a pivoting hinge provided between the supporting bracket and the display to pivotably support the display to pivot in clockwise and counterclockwise direction relative to the supporting bracket, the pivoting hinge comprising
a pivoting shaft provided in a central part of the supporting bracket,
a supporting disc stationarily connected to the pivoting shaft and connected to the supporting bracket, and
a rotating disc rotatably connected to the pivoting shaft and connected to a first surface of the display; and
a main body bracket provided between the display and the supporting bracket and connected to the first surface of the display,
wherein the rotating disc of the pivoting hinge is connected to the main body bracket.

2. The display apparatus according to claim 1, wherein:
the supporting disc of the pivoting hinge comprises a supporting protrusion on a surface facing the rotating disc;
the rotating disc of the pivoting hinge comprises a rotating protrusion on a surface facing the supporting disc; and
the supporting protrusion and the rotation protrusion are approximately equidistant from a center of the pivoting shaft, and limit a rotation angle of the pivoting hinge by contacting with each other.

3. The display apparatus according to claim 1, wherein the pivoting shaft of the pivoting hinge comprises a bolt, passing through a central part of the supporting bracket, stationarily connected to the supporting disc, rotatably connected to the rotating disc, passing through the main body bracket, and connected with a nut.

4. The display apparatus according to claim 3, further comprising a washer provided between a head of the bolt and the supporting bracket.

5. The display apparatus according to claim 1, wherein the tilting hinge comprises:
a main hinge provided on a first part of the supporting bracket to tilt the supporting bracket relative to the attachment bracket; and
a link assembly comprising:
a first link having a first end rotatably connected to the mounting surface to connect the supporting bracket to the mounting surface on a second part of the supporting bracket,
a second link having a first end rotatably connected to the supporting bracket and a second end rotatably connected to a second end of the first link, and
an elastic member provided on at least one point at which each of the first link and the second link is rotated, having an elasticity to restore the supporting bracket to the mounting surface.

6. The display apparatus according to claim 5, wherein the first link and the main hinge of the tilting hinge are connected to the attaching bracket.

7. The display apparatus according to claim 5, wherein the link assembly further comprises a friction part provided between the first link and the second link and producing a rotational friction therebetween.

8. The display apparatus according to claim 7, wherein the rotational friction is larger than the elasticity of the elastic member.

9. The display apparatus according to claim 5, wherein the elastic member comprises a torsion spring and has a first end supported by the first link and a second end supported by the second link.

10. The display apparatus according to claim 7, wherein the friction part comprises:
a connecting bolt inserted in the torsion spring and passing through the first link and the second link;
a connecting nut connected with the connecting bolt; and at least one washer provided between a head of the connecting bolt and the connecting nut.

11. The display apparatus according to claim 2, wherein the tilting hinge comprises:
a main hinge provided on a first part of the supporting bracket to tilt the supporting bracket relative to the attachment bracket; and
a link assembly comprising:
a first link having a first end rotatably connected to the mounting surface to connect the supporting bracket to the mounting surface on a second part of the supporting bracket,
a second link having a first end rotatably connected to the supporting bracket and a second end rotatably connected to a second end of the first link, and
an elastic member provided on at least one point at which each of the first link and the second link is rotated, having an elasticity to restore the supporting bracket to the mounting surface.

12. The display apparatus according to claim 11, wherein the first link and the main hinge of the tilting hinge are connected to the attaching bracket.

13. The display apparatus according to claim 11, wherein the link assembly further comprises a friction part provided between the first link and the second link and producing a rotational friction therebetween.

14. The display apparatus according to claim 13, wherein the rotational friction is larger than the elasticity of the elastic member.

15. The display apparatus according to claim 11, wherein the elastic member comprises a torsion spring and has a first end supported by the first link and a second end supported by the second link.

16. The display apparatus according to claim 13, wherein the friction part comprises:
a connecting bolt inserted in the torsion spring and passing through the first link and the second link;
a connecting nut connected with the connecting bolt; and
at least one washer provided between a head of the connecting bolt and the connecting nut.

17. The display apparatus according to claim 1, wherein the tilting hinge comprises:
a main hinge provided on a first part of the supporting bracket to tilt the supporting bracket relative to the attachment bracket; and
a link assembly comprising:
a first link having a first end rotatably connected to the mounting surface to connect the supporting bracket to the mounting surface on a second part of the supporting bracket,
a second link having a first end rotatably connected to the supporting bracket and a second end rotatably connected to a second end of the first link, and
an elastic member provided on at least one point at which each of the first link and the second link is rotated, having the elasticity to restore the supporting bracket to the mounting surface.

18. The display apparatus according to claim 17, wherein the first link and the main hinge of the tilting hinge are connected to the attaching bracket.

19. The display apparatus according to claim 17, wherein the link assembly further comprises a friction part provided between the first link and the second link and producing a rotational friction therebetween.

20. The display apparatus according to claim 19, wherein the rotational friction is larger than the elasticity of the elastic member.

21. The display apparatus according to claim 17, wherein the elastic member comprises a torsion spring and has a first end supported by the first link and a second end supported by the second link.

22. The display apparatus according to claim 19, wherein the friction part comprises:
a connecting bolt inserted in the torsion spring and passing through the first link and the second link;
a connecting nut connected with the connecting bolt; and
at least one washer provided between a head of the connecting bolt and the connecting nut.

23. The display apparatus according to claim 3, wherein the tilting hinge comprises:
a main hinge provided on a first part of the supporting bracket to tilt the supporting bracket relative to the attachment bracket; and
a link assembly comprising:
a first link having a first end rotatably connected to the mounting surface to connect the supporting bracket to the mounting surface on a second part of the supporting bracket,
a second link having a first end rotatably connected to the supporting bracket and a second end rotatably connected to a second end of the first link, and
an elastic member provided on at least one point at which each of the first link and the second link is rotated, having an elasticity to restore the supporting bracket to the mounting surface.

24. The display apparatus according to claim 23, wherein the first link and the main hinge of the tilting hinge are connected to the attaching bracket.

25. The display apparatus according to claim 23, wherein the link assembly further comprises a friction part provided between the first link and the second link and producing a rotational friction therebetween.

26. The display apparatus according to claim 25, wherein the rotational friction is larger than the elasticity of the elastic member.

27. The display apparatus according to claim 23, wherein the elastic member comprises a torsion spring and has a first end supported by the first link and a second end supported by the second link.

28. The display apparatus according to claim 25, wherein the friction part comprises:
a connecting bolt inserted in the torsion spring and passing through the first link and the second link;
a connecting nut connected with the connecting bolt; and
at least one washer provided between a head of the connecting bolt and the connecting nut.

29. The display apparatus according to claim 4, wherein the tilting hinge comprises:
a main hinge provided on a first part of the supporting bracket to tilt the supporting bracket relative to the attachment bracket; and
a link assembly comprising:
a first link having a first end rotatably connected to the mounting surface to connect the supporting bracket to the mounting surface on a second part of the supporting bracket,
a second link having a first end rotatably connected to the supporting bracket and a second end rotatably connected to a second end of the first link, and
an elastic member provided on at least one point at which each of the first link and the second link is rotated, having the elasticity to restore the supporting bracket to the mounting surface.

30. The display apparatus according to claim 29, wherein the first link and the main hinge of the tilting hinge are connected to the attaching bracket.

31. The display apparatus according to claim 29, wherein the link assembly further comprises a friction part provided between the first link and the second link and producing a rotational friction therebetween.

32. The display apparatus according to claim 31, wherein the rotational friction is larger than the elasticity of the elastic member.

33. The display apparatus according to claim 29, wherein the elastic member comprises a torsion spring and has a first end supported by the first link and a second end supported by the second link.

34. The display apparatus according to claim 31, wherein the friction part comprises:
   a connecting bolt inserted in the torsion spring and passing through the first link and the second link;
   a connecting nut connected with the connecting bolt; and
   at least one washer provided between a head of the connecting bolt and the connecting nut.

35. A display unit, comprising:
   a mounting unit to mount a display on a mounting surface, the mounting unit comprising:
     a supporting bracket to support the display;
     an attachment bracket attached to the mounting surface;
     a tilting hinge provided between the attachment bracket and the supporting bracket to tiltably support the supporting bracket to tilt in frontward and backward directions relative to the mounting surface, the tilting hinge including a link assembly having
       a first link having a first end rotatably connected to the mounting surface to connect the supporting bracket to the mounting surface on a second part of the supporting bracket, and
       a second link having a first end rotatably connected to the supporting bracket and a second end rotatably connected to a second end of the first link; and
   a pivoting hinge provided between the supporting bracket and the display to pivotably support the display to pivot in clockwise and counterclockwise direction relative to the supporting bracket, the pivoting hinge comprising
     a pivoting shaft provided in a central part of the supporting bracket,
     a supporting disc stationarily connected to the pivoting shaft and connected to the supporting bracket, and
     a rotating disc rotatably connected to the pivoting shaft and connected to a first surface of the display.

* * * * *